A47D 1/10 (2006.01)

(12) United States Patent
Mendis et al.

(10) Patent No.: US 7,458,635 B2
(45) Date of Patent: Dec. 2, 2008

(54) VEHICLE SEAT ARRANGEMENT

(75) Inventors: Kolita Mendis, Fox Point, WI (US); John Downs, Simi Valley, CA (US); Benny Sommerfeld, Thousand Oaks, CA (US); Blair Taylor, Thousand Oaks, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/561,046

(22) Filed: Nov. 17, 2006

(65) Prior Publication Data
US 2007/0114824 A1 May 24, 2007

(30) Foreign Application Priority Data
Nov. 21, 2005 (EP) ................. 05111034

(51) Int. Cl.
A47D 1/10 (2006.01)
(52) U.S. Cl. ................. 297/238; 297/254; 297/255; 297/112; 297/118; 297/130
(58) Field of Classification Search ................. 297/112, 297/130, 238, 254, 255, 16.1, 118
See application file for complete search history.

(56) References Cited

U.S. PATENT DOCUMENTS

| 2,584,481 | A | * | 2/1952 | Mast et al. ............. 297/238 X |
| 3,951,450 | A | * | 4/1976 | Gambotti .................. 297/238 |
| 4,541,654 | A | * | 9/1985 | Jonasson ................ 297/254 X |
| 4,555,135 | A | * | 11/1985 | Freeland ................ 297/238 X |
| 4,655,503 | A | * | 4/1987 | Kamijo et al. ............. 297/238 |
| 4,756,573 | A | * | 7/1988 | Simin et al. ............. 297/238 X |
| 4,768,827 | A | * | 9/1988 | Musgrove .................. 297/236 |
| 5,035,465 | A | * | 7/1991 | Hanai et al. ................ 297/238 |
| 5,121,964 | A | * | 6/1992 | Fourrey et al. ............. 297/237 |
| 5,409,293 | A | * | 4/1995 | Nagasaka .................. 297/236 |
| 5,542,742 | A | * | 8/1996 | Fulgenzi et al. ......... 297/238 X |
| 5,722,724 | A |   | 3/1998 | Takei et al. |
| 5,913,533 | A | * | 6/1999 | Lucas et al. ............. 297/238 X |
| 5,971,479 | A | * | 10/1999 | Jacquemot et al. ...... 297/254 X |
| 6,059,358 | A | * | 5/2000 | Demick et al. ......... 297/188.04 |
| 6,199,945 | B1 | * | 3/2001 | Kim ....................... 297/238 X |
| 6,488,333 | B2 | * | 12/2002 | Kim ....................... 297/238 X |
| 6,494,531 | B1 | * | 12/2002 | Kim ....................... 297/238 X |
| 6,502,901 | B2 | * | 1/2003 | Deptolla .................. 297/255 X |
| 6,663,174 | B2 | * | 12/2003 | Drage et al. ................ 297/112 |
| 7,066,536 | B2 | * | 6/2006 | Williams et al. ......... 297/250.1 |
| 7,159,941 | B2 | * | 1/2007 | Thomas ..................... 297/255 |
| 2004/0124378 | A1 |   | 7/2004 | Williams |

FOREIGN PATENT DOCUMENTS

| DE | 3221604 A1 | * 12/1983 | ................. 297/118 |
| DE | 3704972 A1 | * 9/1988 | ................. 297/254 |
| DE | 19732385 |   1/1991 | |
| DE | 19646621 |   11/1997 | |
| FR | 2741847 A |   6/1997 | |
| JP | 59184035 A | * 10/1984 | ................. 297/238 |
| JP | 20044106785 |   4/2004 | |

* cited by examiner

*Primary Examiner*—Rodney B. White
(74) *Attorney, Agent, or Firm*—Dickinson Wright PLLC; Greg Brown

(57) ABSTRACT

A vehicle seat arrangement includes a child seat which is mounted in a rearward facing configuration to a backrest of an adult seat such that the backrest of another adult seat at least partially supports the backrest of the child seat.

8 Claims, 2 Drawing Sheets

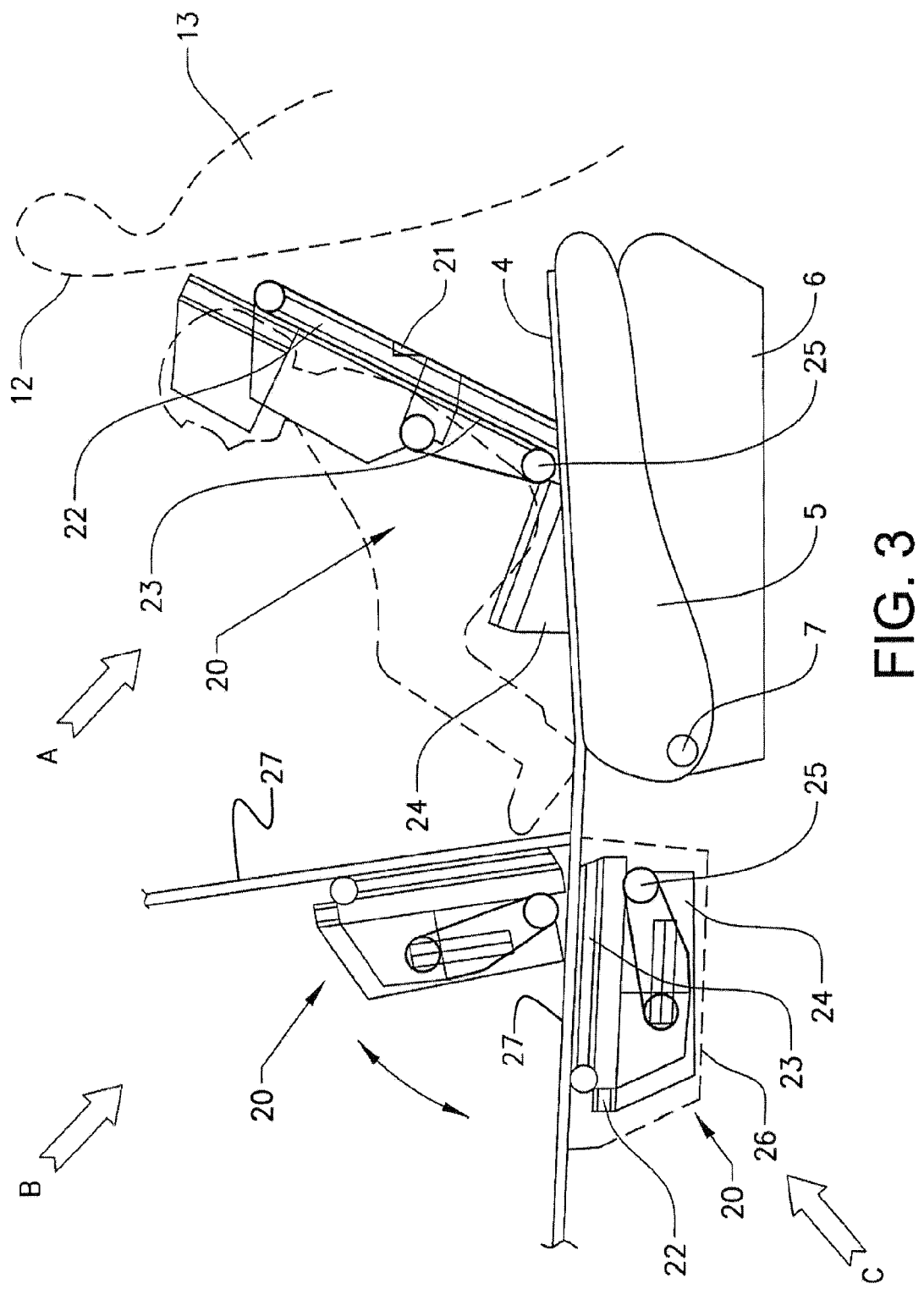

VEHICLE SEAT ARRANGEMENT

RELATED APPLICATION(S)

The present application claims priority to European Patent Application No. 05111034.4, filed Nov. 21, 2005.

BACKGROUND OF THE INVENTION

1. Field of the Invention

The present invention relates to a vehicle seat arrangement, including a rearward facing child seat which is mounted upon a backrest section of a first seat, with the backrest section of the child seat being partially supported by a backrest section of a second full size seat mounted in front of the child seat.

2. Disclosure Information

Rearward facing seating is a primary carrying mode for infants and toddlers riding in vehicles. Rearward facing allows the distribution of inertia forces, acting on a child during a frontal collision, over a larger area against the seatback, as opposed to concentrating the force on seatbelts. Although rearward facing seating has been proven to be a superior seating mode, it is difficult for children at older ages, say in excess of five years of age, to continue this type of seating because of their height. A problem arises because once the feet of tall infants and young toddlers touch the rear seatback in the typical case in which an infant seat or child seat is attached to the seat portion (seat cushion) without first folding the backrest (seat back), the child must bend his or her knees, and this is uncomfortable. It would be desirable to provide a child seat which allows comfortable seating of tall infants and toddlers by accommodating their relatively longer leg length.

SUMMARY OF THE INVENTION

According to an aspect of the present invention, a vehicle seat arrangement includes a first adult seat having a backrest section and a seat section, with the backrest section being foldable from an upright position to a substantially flat position. A rear surface, comprising a portion of the backrest section, is substantially horizontal when the backrest section is folded into its own substantially flat position. A locking means, mounted to the rear surface of the backrest section, locates and holds the child seat in position. The child seat has its own backrest, which is supported in part by a second seat located in front of the first adult seat.

According to another aspect of the present invention, the child seat may be foldable to a collapsed state for storage, with the backrest of the child seat telescoping, and with the seat section being foldable with the backrest for storage. As another option, the child seat is adapted to be attached to the rear surface of the backrest section of the first adult seat when the backrest of the first adult seat is in its upright position.

According to another aspect of the present invention, a foldable bulkhead section is provided, rearward of the first adult seat to which the child seat is attached, for storing the child seat. The foldable bulkhead section may be locked in a substantially upright position when the child seat is in use, with the child seat being mountable to the foldable bulkhead when the child seat is not in use.

According to another aspect of the present invention, the child seat has a high mount position in which the backrest section of the adult seat to which the child seat is mounted is folded into a substantially flat position and the seat section of the adult seat is maintained in a normal operating position. The child seat also has a low mount position in which the seat section of the adult seat to which the child seat is mounted is folded forward to a generally vertical position, so as to permit the backrest section of the adult seat to be folded into a lower substantially flat position.

It is an advantage of a vehicle seat arrangement according to the present invention that a child seat may be mounted in two different positions, so as to accommodate the leg length of a child being carried in the seat.

It is a further advantage of a seating arrangement according to the present invention that the child seat backrest section is supported at least in part by a second adult seat which is mounted in front of the adult seat to which the child seat is being attached.

Other advantages, as well as features of the present invention, will become apparent to the reader of this specification.

BRIEF DESCRIPTION OF THE DRAWINGS

FIG. 3 shows a variant of the present child seat in various storage positions.

DETAILED DESCRIPTION OF THE PREFERRED EMBODIMENT(S)

Figure 1:
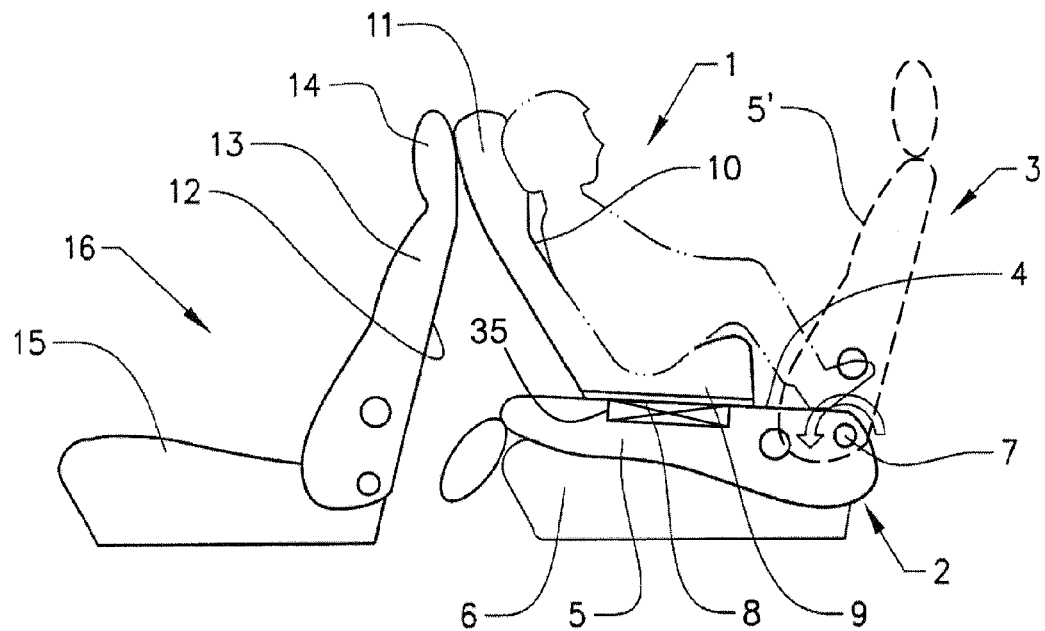
FIG. 1 is a side elevation of a child seating arrangement according to the present invention, illustrating the child seat in a high mount position.

FIG. 1 shows a child seat 1, mounted upon an adult seat 2, located in a rear row of seats 3, according to a first aspect of the present invention. Adult seat 2 has a backrest section 5, and seat section 6. Backrest section 5 is rotatable about pivot 7, with respect to seat section 6. In FIG. 1, the upright position of backrest section 5 is shown in dashed lines, with the solid lines showing the folded position. Backrest section 5 also has a rear surface 4, which is substantially horizontal when backrest section 5 is folded into the substantially flat position shown in solid lines in FIG. 1. Child seat 1 is mounted to rear surface 4 by means of an ISOFIX® fixture, 35, which is mounted to rear surface 4. The ISOFIX® fixture is well known to those skilled in the art and modifications to such fixture may be suggested by this disclosure. Other types of devices may be employed for the purpose of removably attaching child seat 1 to rear surface 4.

Figure 2:
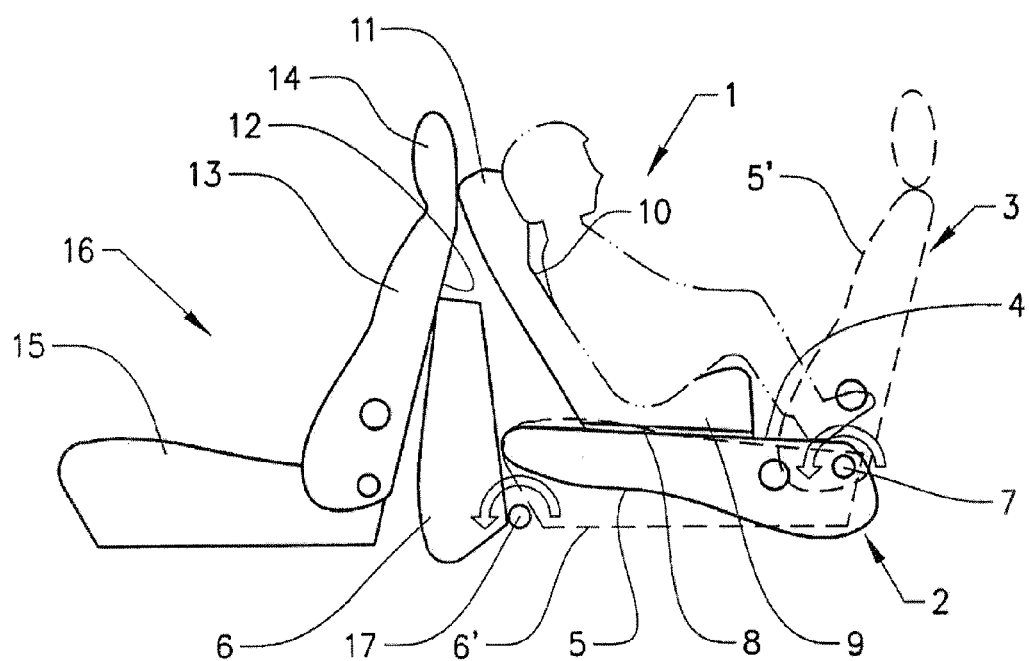
FIG. 2 is similar to FIG. 1 but shows a child seating arrangement in a low mount position.

FIG. 1 shows child seat 1 in a high mount position in which seat section 6 is in its normal operating position. FIG. 2, however, shows child seat 1 in its low mount position in which seat section 6 is folded forward to a generally vertical position, so as to permit backrest section 5 to be folded down to a lower, but substantially flat, position. Movement of backrest 5 can be achieved by suitable pivot or linkage arrangement for the backrest, of the types known to those skilled in the art and suggested by this disclosure. The position shown in FIG. 2 allows a child of greater stature to be comfortably seated in the vehicle. As seen in FIG. 2, backrest 11 of seat 1 and, indeed, the entirety of seat 1 is at a lower position.

According to another aspect of the present invention, it is easily seen from FIGS. 1 and 2 that backrest 11, of child seat 1 is supported at least in part by backrest 13 of second seat 16, which is an adult seat located forward of adult seat 2. This support feature allows child seat 1 to more securely maintain the positions of child seat 1 and a child passenger during a frontal collision.

FIG. 3 shows another embodiment according to an aspect of the present invention, wherein seat 20 is attached to a rear surface, 4, as before. Seat 20 is different, however, because backrest 21 of seat 20 may be collapsed by telescoping an upper part, 22, into a lower part, 23. Then, backrest 21 may be folded around pivot joint 25 and joined to seat portion 24. Then, the seat may be removed and attached to the underside of foldable bulkhead 27, as is shown with reference to Arrow B of FIG. 3. Reference arrow C of FIG. 3 shows seat 20 being mounted under bulkhead 27, while still being attached to bulkhead 27.

While particular embodiments of the invention have been shown and described, numerous variations and alternate embodiments will occur to those skilled in the art. Accordingly, it is intended that the invention be limited only in terms of the appended claims.

What is claimed is:

1. A vehicle seat arrangement, comprising:
   a first seat, having a backrest section and a seat section, with said backrest section being foldable from an upright position to a substantially flat position;
   a rear surface comprising a portion of said backrest section, with said rear surface being substantially horizontal when said backrest section is folded into said substantially flat position;
   a locking means, mounted to said rear surface of said backrest section, for locating and holding a child seat in position;
   a child seat mounted to said locking means, with said child seat having a backrest, and with said child seat being foldable into a collapsed state for storage; and
   a second seat, located in front of said first seat, with said second seat having a backrest section which, at least in part, supports said backrest of said child seat.

2. A vehicle seat arrangement according to claim 1, wherein said backrest of said child seat is telescoping, with said child seat being foldable with said backrest for storage.

3. A vehicle seat arrangement according to claim 1, wherein said child seat is adapted to be attached to said rear surface of said backrest section when said backrest section is in said upright position.

4. A vehicle seat arrangement according to claim 1, further comprising a foldable bulkhead section, rearward of said first seat, for storing said child seat.

5. A vehicle seat arrangement according to claim 4, wherein said foldable bulkhead section is locked in a substantially upright position when said child seat is in use.

6. A vehicle seat arrangement according to claim 4, wherein said child seat is mounted to said foldable bulkhead when not in use.

7. A vehicle seat arrangement according to claim 1, wherein said child seat has a high mount position in which the backrest section of said first seat is folded into a substantially flat position and the seat section of said first seat is in a normal operating position, and a low mount position in which the seat section of said first seat is folded forward to a generally vertical position, so as to permit the backrest section of said first seat to be folded into a lower, substantially flat position.

8. A rearward facing child seat arrangement for a vehicle, comprising:
   a child seat having a backrest section and a seat section, with said child seat being adapted for use in a rearward facing configuration;
   a front seat having a backrest section for contacting and supporting said backrest section of said child seat;
   a rear seat, located behind said front seat, with said rear seat having a folding seat section and a folding backrest section, and with said backrest section being foldable to a substantially flat position; and
   a mounting lock having a first portion attached to said seat section of said child seat and a second portion attached to said backrest section of said rear seat, wherein said seat section and said backrest section of said rear seat have a high mount position in which the backrest section is folded into a substantially flat position, and the seat section is in a normal operating position, and a low mount position in which the seat section is folded forward to a generally vertical position, so as to permit the backrest section to be folded into a lower, substantially flat position.

* * * * *